United States Patent [19]
Peyrot

[11] 3,783,230
[45] Jan. 1, 1974

[54] GUN FOR WELDING TUBES ON A TUBE PLATE

[76] Inventor: Jean-Pierre Peyrot, 1 place de la Division du General Leclerc, Val de Marne, France

[22] Filed: Aug. 10, 1972

[21] Appl. No.: 279,693

Related U.S. Application Data

[63] Continuation-in-part of Ser. No. 64,506, Aug. 17, 1970, abandoned.

[52] U.S. Cl. .......................................... 219/121 EB
[51] Int. Cl. ............................................ B23k 15/00
[58] Field of Search ............... 219/121 EB, 121 EM, 219/60 A, 125, 72

[56] References Cited
UNITED STATES PATENTS

| | | |
|---|---|---|
| 3,463,899 | 8/1969 | Foulquier et al. ............ 219/121 EB |
| 3,426,173 | 2/1969 | Steigerwald................... 219/121 EB |
| 3,497,666 | 2/1970 | Hausen ......................... 219/121 EB |
| 3,535,489 | 10/1970 | Hinrichs....................... 219/60 A X |

*Primary Examiner*—J. V. Truhe
*Attorney*—Karl W. Flocks

[57] ABSTRACT

A rotatable welding gun comprising an electron gun, a secondary vacuum chamber around the said gun and a primary vacuum chamber at the level of the joint to be welded, a centering mandrel, a sealing plug at the free extremity of said mandrel and an annular sealing joint on the periphery of said primary vacuum chamber, in order to weld automatically the tubes of a heat exchanger on the bottom plates.

6 Claims, 4 Drawing Figures

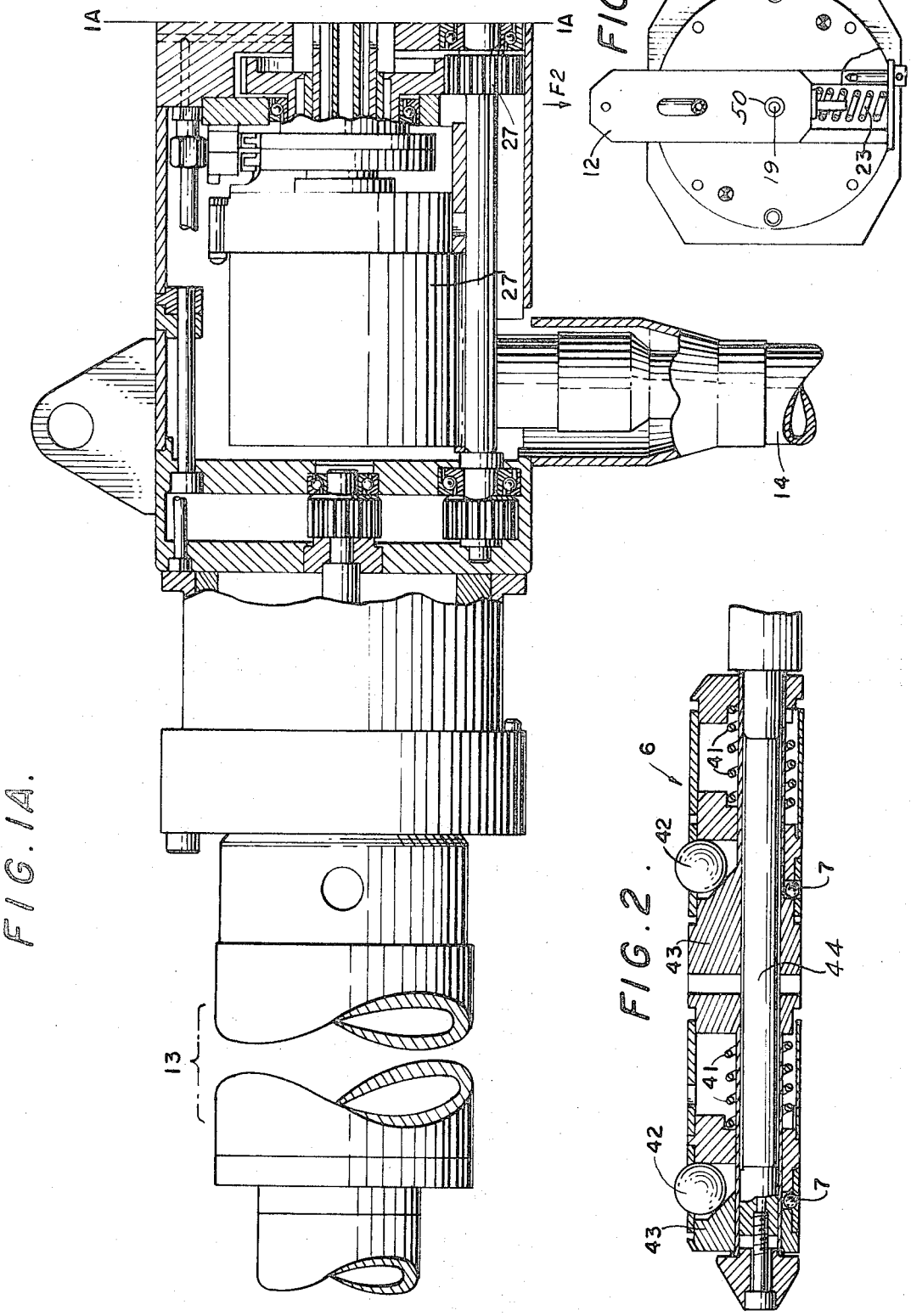

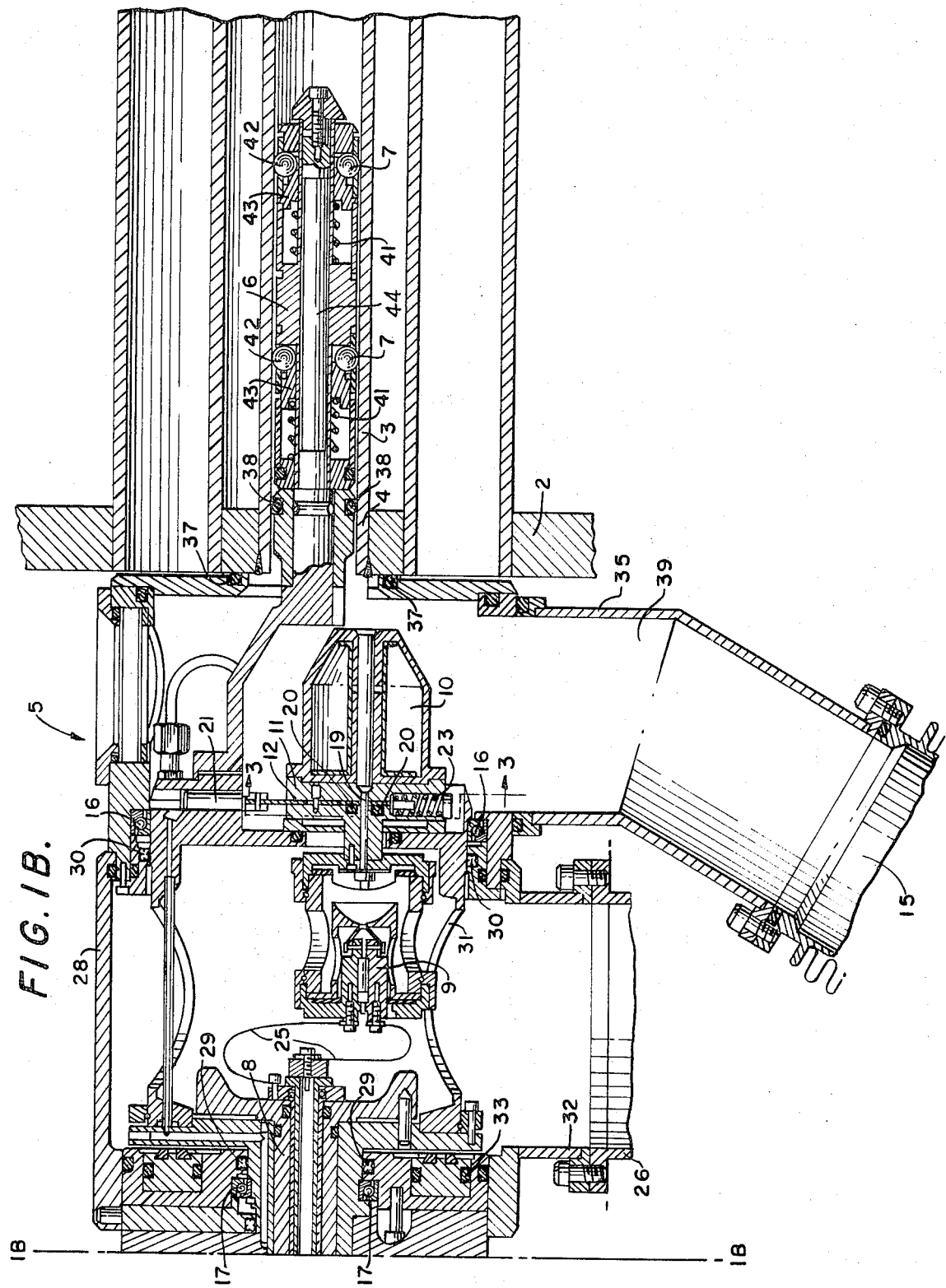

3,783,230

GUN FOR WELDING TUBES ON A TUBE PLATE

BACKGROUND OF THE INVENTION

This application is a continuation-in-part of U.S. Pat. application Ser. No. 64,506 filed Aug. 17, 1970, now abandoned.

The present invention relates to a gun for welding tubes on a tube plate, and more particularly to a rotary gun for welding by electron bombardment.

Welding by electron bombardment has considerable advantages, especially in regard to rapidity of welding and small deformation of the parts to be welded, but the necessity of ensuring a vacuum around the weld sometimes limits its use.

In particular, for welding a large number of exchanger tubes on the end plates, it is desirable to have available a rotary gun with electron bombardment.

SUMMARY OF THE INVENTION

The present invention also provides a rotary electron welding gun which ensures the necessary vacuum around the weld, to the exclusion of any other device.

The invention also provides a rotary electron welding gun specially adapted for welding tubes on the endplate of an exchanger, the gun being centered on the tube by means of an expanding mandrel which terminates in a sealing plug, a circular joint being provided around the face of the gun in contact with the end-plate in order to give perfect fluid-tightness.

The sealing of the tube in the plate is ensured by previously rolling over the end of the tube.

BRIEF DESCRIPTION OF THE DRAWINGS

Other characteristic features and advantages will be brought out in the description which follows below made with reference to the accompanying drawings, showing by way of indication but not in any limitative sense a rotatable welding gun according to the invention, wherein:

FIGS. 1A and 1B together show a diagrammatic view in partial elevational section of the complete rotatable welding gun of the present invention in operation position connected to the opposite positions at lines 1A—1A and 1B—1B respectively;

FIG. 2 is an enlarged sectioned view of the expanding mandrel portion of the rotatable welding gun of FIGS. 1A-1B showing inner and outer portions depicted on opposite sides of the longitudinal center line;

FIG. 3 is a view of the isolating gate along line 3—3 of FIG. 1B.

DESCRIPTION OF THE PREFERRED EMBODIMENT

Shown in portions in FIGS. 1A-1B are a thick plate 2 having a tube 3 expanded or rolled at 4 in the plate 2.

Against the plate 2 there is forced the gun 5 which is centered in the expanded tube 3.

The gun 5 is provided with an expanding mandrel 6, also shown in the enlarged view of FIG. 2, wherein is shown separately the inner and outer portions, having accurate centering, in which are ball-bearings 7 which enable the rotating system to operate. The rotating system compresses, fixed to each other, a shaft 8 serving as a support for the current transmitter of the gun 9, and a focussing coil 10, a valve support and centering shaft 11 and a valve 12, shown in another view of FIG. 3, which enables the system to be accurately centered on the axis of the tube 3 during the rotational movement of the system moved by means of a motor 13.

This rotating system is centered and can rotate inside the fixed body of the gun on ball-bearings 16 and 17 and other positioned bearings shown.

The support 11 is pierced with a hole 19 permitting the passage of the electron beam. This orifice 19 is closed by means of a fixed jack 21 acting on the slidevalve 12 when this slide value 12 is in front of jack 21. The tightness of the sealing between chambers in part 35 and chamber 28 is formed by the slide-valve 12 against joint 20. This flat separating sliding type valve enables the gun to be kept under a secondary vacuum in the upper chamber, when the lower chamber comprising the joint to be welded is put into communication with free air. During rotation the valve 12 is always kept opened by spring 23. Electrical safety devices are provided for preventing the closing action of the jack 21 when the gun 5 is not in the starting position. Sliding valve 12 is thus normally biased by spring 23 and, in the open position of the valve, the hole 50 is aligned with orifice 19 of support 11 of sliding valve 12. The closing jack 21 is provided to, in a determinate fixed convenient position of the rotating gun (FIG. 1B), to close the valve 12 in the direction of arrow F2 (FIG. 3) and, in that case, the hole 50 of valve 12 is moved downwardly radially outside of the axis of the election gun, and all communication is closed between primary chamber 35 and secondary chamber 28. Consequently while valve 12 rotates with the movable parts of gun 5 communication between chambers is maintained open for passage of the electron beam.

The coil 10 is rigidly connected for rotation with the gun 9, the cathode of which can rapidly be taken down, following applicant's U. S. Pat. No. 3,612,942 dated Oct. 12, 1971.

The gun 9 is fixed and centered with respect to the axis of rotation on the plate-shaft 8 by a readily removable quick-grip plug-in device. The shaft 8 may also serve as a current transmitter using a mercury bath, the whole forming the fluid-tight rotating mercury seal known per se. The current supply leads are shown at 25 which are fed through the electric power supply cable 14.

The motor 13 and the reduction gearing 27 are rigidly fixed to the fixed body of the overall welding gun and coupling shown ensures the connection of shaft 8 to motor 13 through reduction gearing 27.

The fixed body constitutes the shell of the vacuum chambers 28. The secondary vacuum chamber in which the electron gun 9 is located is kept fluid-tight by means of the joints 29 and 30. Pumping is effected through the orifice 31. In order to create the vacuum, a flexible pipe 26 couples a secondary pump to metal part 32, the fluid-tightness of this part around the orifice 31 being effected by a joint 33.

The primary vacuum chamber is formed by a metal part 35. Its fluid-tightness is ensured by the joints 37 and 38 and the expanded portion 4. In order to create the vacuum, a flexible pipe 15 joins the primary pumping branch circuit of the secondary pump to the orifice 39.

As shown in the enlarged view of FIG. 2 the expanding mandrel 6 has ball bearings 7 forced outward against tube 3 through action of springs 41 causing sliding parts 43 to cam bearings 42 against a sloping surface of sliding parts 43. This maintains an outward force from mandrel 6 against tube 3 to give the mandrel its expanding action. The ball bearings 7 on the inner portion of mandrel 6 supports shaft 44 forming the center of mandrel 6 which rotates through its connection to the rotating system and its ultimate connection to shaft 8.

It can be seen that the rotatable gun according to the invention permits accurate welding by electron bombardment of tubes expanded into a plate, in a very rapid manner, since it is only necessary to create the primary vacuum in a very small chamber in a few seconds, to open an extra-flat valve in a few seconds and to carry out the welding in a few seconds.

It will of course be understood that the present invention has been described above purely by way of indication of a preferred example and not in any limitative sense, and that any equivalence may be introduced into its constituent elements without thereby departing from its scope, as defined by the appended claims.

What is claimed is:

1. A rotatable portable welding gun for welding a tube extending from a plate at a joint to said plate comprising
   an electron gun,
   means to rotate said electron gun connected to said electron gun,
   a secondary vacuum chamber around said electron gun,
   a primary vacuum chamber at a level of a joint to be welded having an opening over the tube to be welded,
   a centering mandrel extending from and aligned with an opening in said primary vacuum chamber,
   a sealing joint on said mandrel and an annular sealing joint on the periphery of the opening in said primary vacuum chamber,
   value means connecting said vacuum chambers, said vacuum chambers substantially coaxial with said centering mandrel and located together with said rotating means and said sealing joints on the opposite end of said mandrel from its free end.

2. A welding gun in accordance with claim 1 further characterized by
   said electron gun being displaced radially with respect to the axis of said mandrel and connected to rotate about the center axis of said mandrel.

3. A welding gun in accordance with claim 1 further characterized by said value means comprising
   a flat isolation valve for said secondary vacuum chamber, located between said secondary and primary vacuum chambers, said valve always being in an open position during rotation of said electron gun.

4. A welding gun in accordance with claim 3 further characterized by
   said isolation valve including
   a slide,
   a jack attached to said slide,
   means to push against said jack in contact with said jack at least a portion of the time during rotation of said electron gun,
   spring means to oppose said pushing means.

5. A welding gun in accordance with claim 4 further characterized by
   a support means for said slide and said jack having a hole therethrough aligned with the beam of said electron gun to allow passage of said beam.

6. A welding gun in accordance with claim 7 further characterized by
   said valve closing said hole only at a determined radial starting position of the rotating of said electron gun.

* * * * *